United States Patent [19]
Jacobson

[11] 3,851,933
[45] Dec. 3, 1974

[54] HYDRODYNAMIC FLUID-FILM BEARINGS

[75] Inventor: Peter E. Jacobson, Phoenix, Ariz.

[73] Assignee: Sperry Rand Corporation, New York, N.Y.

[22] Filed: June 12, 1972

[21] Appl. No.: 261,899

[52] U.S. Cl. ................................. 308/9, 308/134.1
[51] Int. Cl. ........................................... F16c 35/00
[58] Field of Search ....... 308/171, 168, 170, 9, 122, 308/134.1

[56] References Cited
UNITED STATES PATENTS

| | | | |
|---|---|---|---|
| 1,176,833 | 3/1916 | Kennedy | 308/168 |
| 1,715,978 | 6/1929 | Benit | 308/171 |
| 1,982,937 | 12/1934 | Walter | 308/168 |
| 2,729,106 | 1/1956 | Mathiesen | 308/9 |
| 2,956,841 | 10/1960 | Cametti et al. | 308/237 R |
| 3,517,973 | 6/1970 | Hirs | 308/9 |
| 3,597,026 | 8/1971 | Jarosh | 308/134.1 |
| 3,655,248 | 4/1972 | Hirs | 308/9 |

FOREIGN PATENTS OR APPLICATIONS 200,072 0/1954 Austria ................................. 308/9

*Primary Examiner*—Charles J. Myhre
*Assistant Examiner*—R. H. Lazarus
*Attorney, Agent, or Firm*—Howard P. Terry; Thomas J. Scott

[57] ABSTRACT

A pair of spin type bearings employing a fluid-film between the bearing surfaces in a journal bearing and a combination journal and thrust bearing which are particularly suitable for gyroscopic applications. Each bearing includes a fluid flow control system comprised of reservoirs disposed proximate the bearing surfaces which automatically supply required quantities of fluid to the bearing surfaces during operation. The control system may be either an open-loop configuration or a closed loop configuration. In the open-loop configuration, a visual indication of the fluid quantity in a reservoir is provided along with means for replenishing the fluid supply without interfering with the operation of the bearings. Alternatively, in the closed loop system, the visual indication and means for replenishing the fluid supply are replaced by means which provide recirculation of the initial quantity of fluid in the reservoir. Both configurations are uninfluenced by acceleration loading and provide bearings having long term operating characteristics which are particularly suitable for operation in the hard vacuum of outer space without loss of fluid.

10 Claims, 7 Drawing Figures

//3,851,933//

HYDRODYNAMIC FLUID-FILM BEARINGS

BACKGROUND OF THE INVENTION

1. Field of the Invention

This invention pertains to spin bearings which may be utilized in gyroscopic apparatus and more specifically to gyroscopic apparatus particularly suitable for use in large angular momentum gyroscopes such as those used in stabilizing space vehicles; for example, a control moment gyroscope (CMG) and reaction wheel assembly (RWA).

2. Description of the Prior Art

This application describes an improvement in spin bearings which are typically ball bearings such as described in a copending application Ser. No. 127,986 entitled "Gyroscope", now U.S. Pat. No. 3,742,769 filed Mar. 25, 1971 in the names of James E. Crutcher and Lawrence P. Davis and assigned to the same assignee as the subject invention. In considering weight optimization of control moment gyroscopes such as those disclosed in the copending application, it becomes apparent that spin type ball bearings introduce limiting conditions with respect to the life, the reliability and the torque sensitivity (power) to loads resulting from gyroscopic reaction torques and environmental capabilities. The ability to reduce the running power of a device which employs spin type ball bearings by decreasing the sealed case pressure is limited by the spin bearing lubrication vapor pressure at the operating temperature. The spin bearing lubricant develops its own partial pressure that is higher than the desired case ambient pressure. In order to alleviate this condition the case is vented to the surrounding environment and the loss of lubricant is controlled with a shaft seal. A somewhat delicate tradeoff is then required between the lubricant induced torque in the bearing and the life of the device which is related to the lubricant loss rate. Further, the amount of lubricant that may be initially installed in a ball bearing system is limited because the bearing will become unstable with too much lubricant producing drastic power changes. As a result the ball bearings will reject the extra lubricant but only after the balls have become damaged, for example, by pitting. Since the quantity of lubricant that may be initially used in a ball bearing is limited, both the lubricant-induced torque and the life of the bearing are sensitive to the quantity of the lubricant in the device.

A few of the distinct advantages offered by hydrodynamic fluid film bearings when compared to ball bearings are: the theoretical load-carrying capacity of a hydrodynamic bearing is unlimited, running torques are only very moderately affected by loads, and therefore a lower torque/load ratio is possible with hydrodynamic bearings than with ball bearings, hydrodynamic bearings can support higher impact loads than ball bearings because squeeze-film damping effects provide additional load-carrying capacity against impact loads in a hydrodynamic bearing. Hydrodynamic film bearings have theoretically unlimited life but in practice they are subject to start-stop frequency, oxidation, polymerization, degradation and evaporation of the lubricant. Further, if the hydrodynamic bearing is not properly designed, cavitation might cause pitting of the surfaces and hence failure.

Although a preloaded pair of ball bearings can be designed to support both radial and axial loads, the load capacity of such a pair in a particular direction is usually much higher than in other directions. In applications requiring equal load-carrying capacity in all directions a suitably designed hydrodynamic film bearing is more useful. Ball bearings perform poorly under reciprocating loads whereas hydrodynamic film bearings provide better rotor-to-stator vibratory resistance because of the squeeze-film effect while also sustaining reciprocating loads without any surface damage. Finally, ball bearing assemblies require elaborate axial alignment schemes to minimize thermally and acceleration-induced loading on the bearing.

The hydrodynamic bearing as known in the prior art has the following disadvantages when compared to the conventional ball bearing: it is more temperature sensitive, starting and dynamic torques may be higher, more lubricant is required, loss of load capacity may occur if the lubricating film is broken, lubricant capture, flow control and storage is required, and instabilities may occur in a lightly loaded bearing operating at high speeds.

In the prior art the disadvantages of the hydrodynamic fluid film bearing produced compromises in their design and use. Since they are temperature sensitive the operating temperature had to be closely controlled in order for the bearing to function properly which limited their use. Further, the requirement of lubricant capture, flow control and storage increased the size of the bearing, otherwise elimination of these requirements limited the life of the bearing to the time over which loss of the lubricant occurred. The requirement for increased lubricant also increased the relative size of the bearing and the loss of the load capacity due to the occurrence of film breakdown produced a lower reliability in the bearing.

The subject invention provides passive temperature compensation and a fluid-film system with sufficient lubricant capacity to provide a hydrodynamic bearing with extremely long life and high reliability which may be incorporated in many various mechanisms where these advantages are important and is particularly suitable for space vehicle applications.

SUMMARY OF THE INVENTION

The spin type bearings of the present invention are hydrodynamic fluid-film bearings described as comprising a pair of bearings which rotatably support the ends of a shaft of a gyroscopic rotor. One of the pair of bearings is a floated journal bearing which provides only radial support to one end of the shaft. Therefore, the bearing is free to translate in an axial direction. The second bearing is a combination journal and thrust bearing which supports the other end of the shaft in both the radial and axial directions. Each journal element coacts with a combination sleeve element comprised of two materials. Each material has a different coefficient of thermal expansion which in turn is different from the coefficient of thermal expansion of the journal material. These materials are computer matched to provide passive thermal compensation for the journal bearings over a given range of operating temperatures.

Each journal has an inner chamber in which a reservoir formed of porous material is disposed. A fluid which serves as the lubricant for the bearing surfaces is impregnated in the porous material and an additional quantity of the fluid is added to the reservoir. Ports are located around the surface of the journals and serve to communicate the fluid from the reservoirs to the spaces between the bearing surfaces. The bearings are configured so the amount of lubricant lost from the bearing surfaces is minimal over relatively long periods of time. However, the porous materials in combination with the ports function as automatic fluid-flow control systems by centrifuging the fluid in the reservoirs to the porous materials and from these materials through the ports into the bearing spaces to automatically replace any quantity of lubricant lost from between the bearing surfaces.

Additional reservoirs comprised of the porous material are disposed proximate the bearings to absorb and store any lubricant lost by the bearings. These reservoirs may comprise an open-loop system or a closed-loop system. In the closed-loop system the lubricant stored in the additional reservoirs is recirculated back to the journal reservoirs through wicks formed of the porous material which are coupled between the journal reservoirs and the additional reservoirs thereby providing a hydrodynamic fluid-film bearing of extremely long life.

The open-loop system has lubricant quantity indicators inserted in place of the wicks. Each indicator includes a viewing surface which allows the quantity of lubricant present in the journal reservoir to be observed from outside the gyroscopic apparatus. The viewing surface includes a small hole which allows the inner cavity of the journal to be filled with lubricant by using a hypodermic needle or other appropriate means. The operation of the self-contained fluid-film system in the open-loop configuration contains sufficient lubricant capacity to provide a hydrodynamic bearing with a predictable life that is greater than or corresponding to the life of its mission.

The thrust bearing is comprised of radially extending thrust pads circumferentially mounted on the journal at one end of the shaft and cooperative radially extending surfaces on the sleeve at the same end of the shaft. The thermal expansion coefficient of the journal and a third material in the sleeve at that end of the shaft are also computer matched to provide passive thermal compensation for the thrust bearing over the same range of operating temperatures as for the journal bearings.

BRIEF DESCRIPTION OF THE DRAWINGS

FIG. 4b is an elevation section of the indicator of FIG. 4a.

DESCRIPTION OF THE PREFERRED EMBODIMENT

Figure 1:
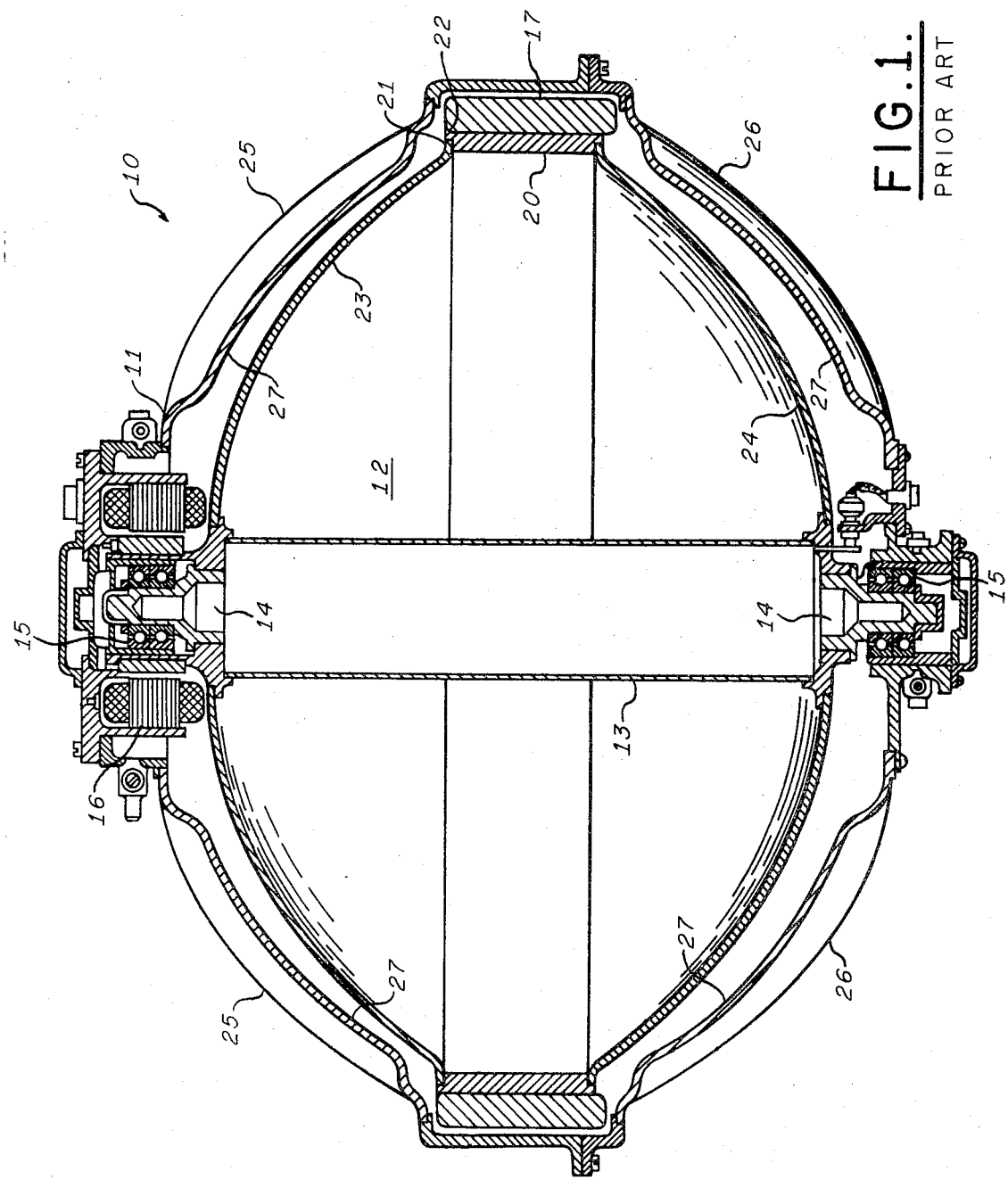
FIG. 1 is a cross-sectional view of a control moment gyroscope employing spin type ball bearings.

The hydrodynamic fluid-film bearings disclosed herein will be described with reference to a typical gyroscopic application. A brief description of a gyroscopic application employing spin type ball bearings will be provided with reference to FIG. 1 for background purposes. As shown in FIG. 1 a control moment gyroscope 10 includes a housing 11 which encloses a gyroscopic rotor 12 supported on a shaft 13 having end portions 14 which are rotatably supported in spin type ball bearings 15. A drive motor 16 mounted in one end of the housing 11 provides rotational motion to the rotor 12. The rotor 12 may be comprised of a steel rim 17 which is fitted into rim 20 and secured in place by swaging a lip 21 around a steel rim edge 22. Further, a pair of shells 23 and 24 are disposed between the shaft 13 and the rim 20. The housing 11 includes two spherical shells 25 and 26 having radial dimples 27 embedded therein to increase the strength and stiffness of the shells.

The spin bearing lubricant in the configuration shown in FIG. 1 develops its own partial pressure which is higher than the desired case ambient pressure. Alleviation of this condition requires venting of the bearing to the surrounding environment which results in a loss of lubricant that may be only partially controlled with a shaft seal. Since the amount of lubricant which may be initially installed in a ball bearing is limited, loss of lubricant becomes a limiting factor in the life of the bearing.

Studies have shown that the two main sources of vibration from a control moment gyroscope are produced by rotor imbalance and the geometric imperfections in spin type ball bearings. Vibration due to rotor imbalance may be corrected by designing the rotor so that it is balanced at its lowest practical level. Reducing the vibrations due to geometric imperfections in the bearings requires increased control on the manufacture of the bearings which result in attendant complexities and increased cost in producing the bearings.

Figure 2:
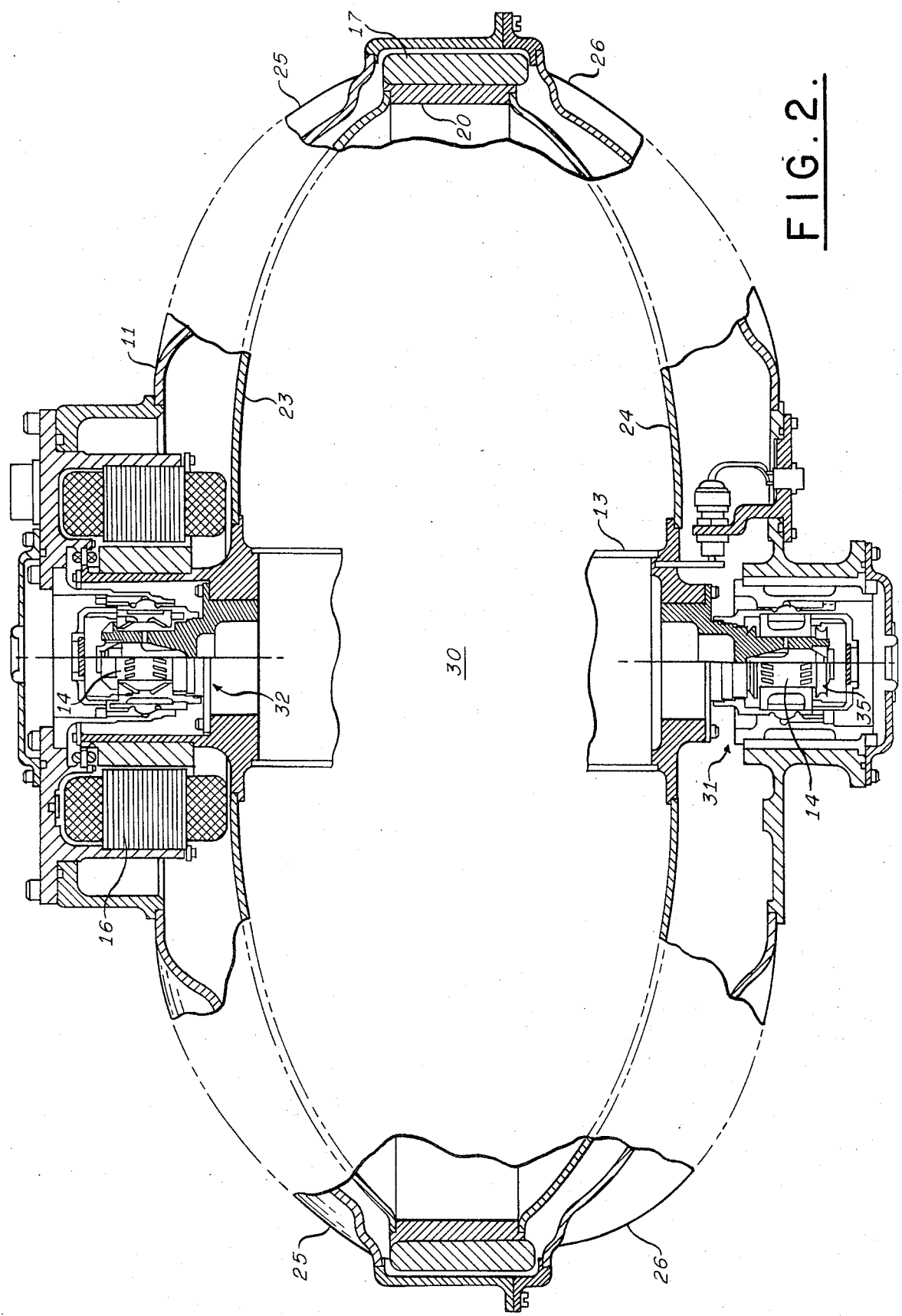
FIG. 2 is a cross-sectional view of a control moment gyroscope including a pair of hydrodynamic fluid-film bearings using an incompressible fluid as a lubricant.
Figure 3:
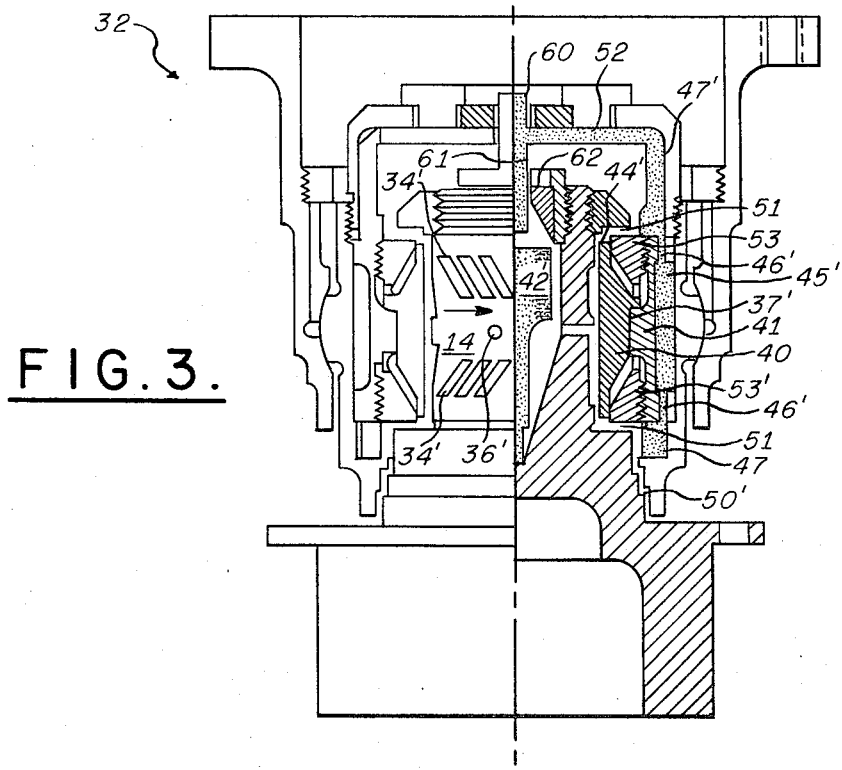
FIG. 3 is a drawing of a combination journal and thrust hydrodynamic bearing with a closed loop fluid-film system.
Figure 4:
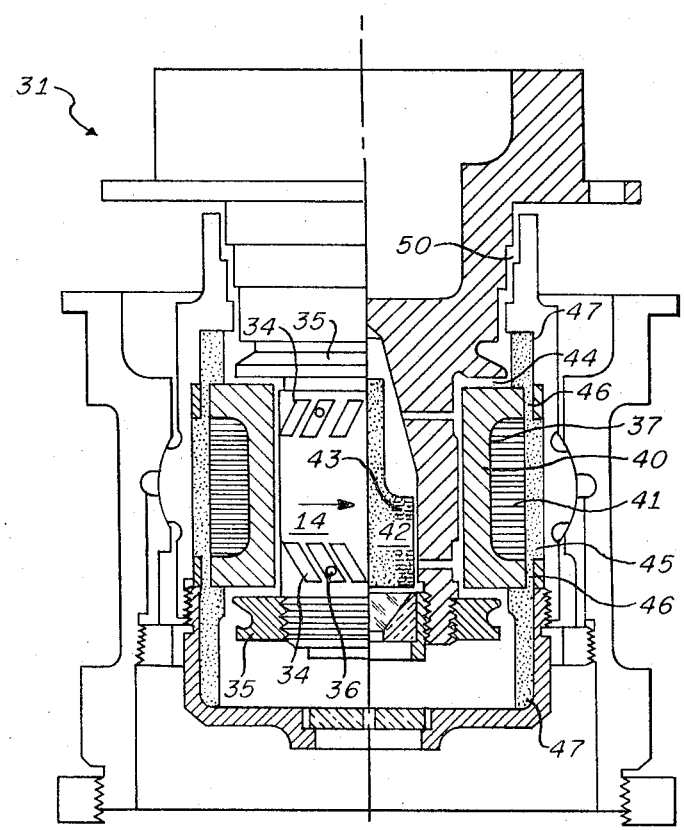
FIG. 4 is a cross-sectional view of a floated journal hydrodynamic bearing with an open loop fluid-film system.

The hydrodynamic fluid-film bearings 31 and 32 shown in FIG. 2 eliminate the vibrations produced by geometric imperfections in spin type ball bearings and significantly reduce loss of the lubricant. Components common to FIG. 1 and FIG. 2 are designated with the same reference characters. A housing 11 encloses a gyroscopic rotor 12 supported on a hollow cylindrical shaft 13 having end portions 14. Two different types of bearings (open loop and closed loop) are shown in FIG. 2 and it will be understood that preferably in any one gyro design, the same type of bearing would be used. Also, one of these is a closed loop thrust bearing and the other an open loop floating bearing. Again, in a typical application, both bearings would be either open loop or closed loop. As shown in FIGS. 3 and 4, the end portion 14 forms journals having herringbone patterns 34 in the form of grooves which may be suitably engraved on the surface of the journals. The hydrodynamic bearing 32 is an axially fixed closed loop thrust bearing and the bearing 31 is an axially floating open loop journal bearing. Journal bearing 31 includes slingers 35 mounted on the journal end 14, the slingers preferably forming a knife edge for severing any lubricant droplets which attach thereto, as will be described later. A plurality of ports 36 are located at the periphery of the journal 14 as shown in greater detail in FIG. 4. A sleeve 37 in the bearing 31 is a combination of two materials 40 and 41 having different coefficients of thermal expansion, each of which is different from the thermal coefficient of the material used in the journal ends 14 of the shaft 13.

Figure 4B:
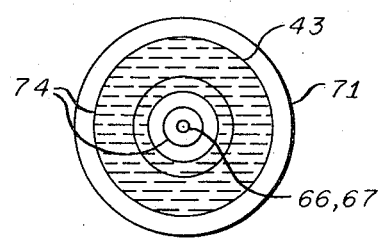
Figure 4A:
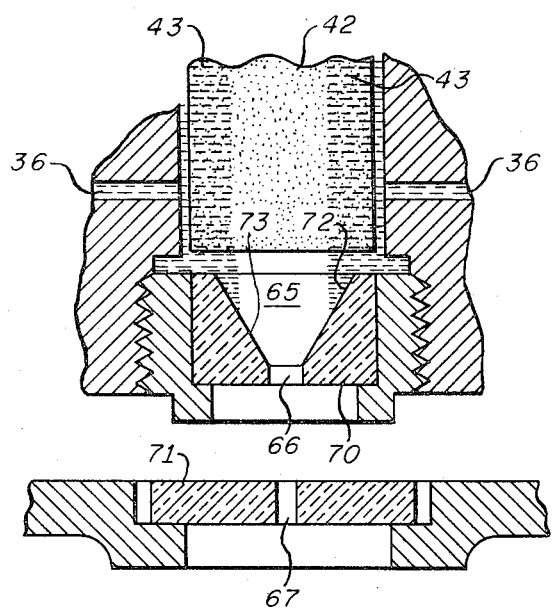
FIG. 4a is a drawing of the lubrication quantity indicator used in FIG. 4.

Each journal end 14 has disposed therein a reservoir 42 for containing a quantity of lubricant 43. The reservoir 42 comprises a plug sintered material that is preferably vacuum impregnated with the bearing lubricant 43, the plug then being inserted into a cavity within journal 14. As shown in FIG. 4a the reservoir 42 has an inner cavity 65 which is accessible through a small hole 66 in the glass cover plate 67 in the end of the journal 14. The lubricant 43 is forced from the reservoir 42 by the centrifugal force created in the rotating shaft 13, out through the plurality of ports 36 to the bearing space 44 formed by journal end 14, slingers 35 and sleeves 37. In the preferred embodiment shown in FIG. 2, and shown in greater detail in FIG. 4, the sleeve 37 includes a second reservoir 45 which may also comprise sintered solid material and which is coupled through return port 46 to a pair of further reservoirs 47. Also included in the bearing 31 is a labyrinth stepped seal 50 which provides a single opening to the ambient from the bearing 31.

As shown in FIG. 4a, a glass cover plate 70 has an inner truncated cone-shaped cavity 65 which is accessible through a pair of small aligned holes 66 and 67. The lubricant contained in the reservoir 42 while static is centrifuged out to the periphery of the sintered material when the journal spins up to speed. The lubricant then forms inside the glass cover plate 70 as a fluid ring shown more clearly in FIG. 4b that is observable through an end viewing plate 71. Since the light rays at the lubricant-glass interface 72 are neither refracted nor reflected and the light rays at the air-glass interface 73 are reflected, the fluid ring becomes visible while the journal is spinning. The principle is the same for earth-bound and space applications since the normal acceleration experienced by the gyro is many times the acceleration due to gravity. Further, the aligned holes 66 and 67 in the glass cover plate 70 and the end viewing plate 71, respectively, allow the inner cavity of the reservoir 42 to be filled with the journal rotating by using a hypodermic needle. Sighting rings 74 engraved on the glass cover plate facilitate the alignment of the observer and the image produced by the fluid ring thereby minimizing the occurrence of paralax in observing the oil quantity.

The hydrodynamic fluid-film bearing 32 at the opposite end of the shaft is a combination thrust and journal bearing which includes a closed loop reservoir system rather than the open loop embodiment shown in FIGS. 2 and 4. Thrust pads 51 are provided at opposite ends of the sleeve 37. The thrust pads 51 are shown in greater detail in FIG. 3A include engraved spiral grooves 52 which coact with the end surfaces of members 53 and 53' which form a part of the sleeve 37' proximate the thrust pads 51 to accurately maintain the axial position of the shaft 13. The sleeve 37 includes a first triad of materials 40, 41 and journal 14 having different coefficients of thermal expansion, each of the materials 40 and 41 having a different coefficient of thermal expansion than the journal end 14. A second triad of materials 41, 53–53', and journal 14 is provided for the thrust bearing 51.

The journal end 14 of the bearing 32 has a herringbone surface pattern 34' which is oriented in a direction opposite to that of the surface pattern 34 on the journal end 14 in the bearing 31. As in the bearing 31 this surface pattern 34' may be comprised of grooves formed by an engraving process. Centrally disposed with respect to the surface pattern 34' is a plurality of ports 36' which connect the bearing surfaces of the journal end 14 to a reservoir 42' which may also constitute a plug of sintered material and which also is completely impregnated with the lubricant 43. Centrifugal force created by the spinning shaft 13 creates a fluid pressure head which forces the lubricant 43 into the bearing 32 only on demand or when needed through the ports 36 into a space 44' formed by the surfaces of the journal end 14, the sleeve 37' and the thrust pairs 51. A collecting reservoir 45' disposed within the sleeve 37' is coupled through return ports 46' to further collecting reservoirs 47'. Should the fluid film pressure within the bearing change, for example, due to an acceleration force on the gyro, the pressure head at the hold 36' will immediately supply additional fluid to maintain the design pressure.

As shown in FIG. 3, the hydrodynamic fluid-film bearing 32 includes a return path 52 of porous or sintered material which coacts with a wick 60 of sintered material to provide a closed loop self-regulated lubrication system by coupling the lubricant 43 in reservoir 47' back to the internal cavity within the trunnion 14.

As stated above, both bearings 31 and 32 may employ either open loop reservoir systems, i.e., reservoir 52 and wick 60 are omitted as shown in FIG. 4, or both bearings may be closed loop systems, i.e., reservoir 52 and wick 60 are included as shown in FIG. 3, or one bearing may have an open loop system and the other bearing a closed loop system depending upon the specific application.

In applications requiring a lubricant life of approximately 3 to 5 years, an open loop system will provide desired performance because the reservoir 42 in this system can supply sufficient quantities of the lubricant 43 to maintain the space 44 in the bearings 31 filled for this period of time. Longer life can be expected from the closed loop system of bearing 32.

In operation the lubricant 43 in the reservoirs 42 is constantly being forced towards the surfaces of the journal ends 14 proximate the sleeves 37 as the shaft 13 rotates. The rate of flow of the lubricant 43 through the ports 36 is a function of the rate at which the lubricant 43 escapes from the spaces 44.

On the surface of the floating journal 14, FIG. 4, the lubricant is supplied through the ports 36 along the peripheral edges of the journal 14. The surface pattern 34 is disposed at approximately 60° with respect to the axis of rotation X—X and oriented as inverted truncated V's on the surface of the journal 14. For this configuration the rotation of the journal 14 is from top to bottom towards an observer, i.e., in the direction of the arrow. The surface pattern 34 will pump the lubricant 43 from the ports 36 towards the center of the journal 14 thereby providing only radial support for the shaft 13.

Figure 3A:
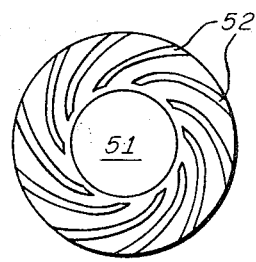
FIG. 3A is a drawing of a thrust pad used in the combination bearing of FIG. 3.

On the surface of the thrust journal 14 of FIG. 3 the lubricant 43 is supplied through the ports 36 at the center of the journal 14. Again the surface pattern 34 is disposed at approximately 60° with respect to the axis of rotation X—X but oriented as truncated V's on the surface of the journal 14. For this configuration also the rotation of the journal 14 is in the direction of the arrow. The surface pattern 34 therefore will pump the lubricant from the ports 36 at the center towards the edges of the ends of journal 14 thereby forcing the lubricant 43 into the spaces 44' and between the thrust pads 51 and the facing surfaces on the sleeve elements 53 and 53'. Additional lubricant 43 is available as required via ports 36 to maintain sufficient lubricant in the spaces 44' whenever there is any loss of the lubricant from the spaces 44'. In practice the spaces 44' between the thrust bearing surfaces are approximately an order of magnitude smaller than the spaces 44 between the slingers 35 and the material 40. A function of the thrust pads 51 is to retain the lubricant 43 within the space 44' in the thrust bearing 32 thereby reducing the flow rate of the lubricant. Referring to FIG. 3A it will be observed that the spiral grooves are disposed so that the lubricant is pumped toward the journal 14 whereby the lubricant is pressurized in the corners at the ends of the journal 14. An additional important feature of the thrust pads 51 which contributes to retaining the lubricant 43 within the spaces 44' is the sharp outboard corners on these elements. By making these outboard corners as sharp as possible relative to the meniscus angle of the lubricant 43, it will deter the lubricant 43 from wetting around the corners and escaping from the space 44'. Further, decreasing the clearnace between the sleeve 37' and the thrust pads 51 enables the corner angles to be made smaller which increases the surface tension forces holding the lubricant 43 in the space 44'. The function of the slingers 35 of FIG. 4 and an additional function of the thrust pads 51 of FIG. 3 is to hurl any lubricant 43 which does escape from the spaces 44 towards the additional reservoirs 47 and 47'. The porosity of these reservoirs provide capillary action which draws any lubricant on their surfaces into the reservoirs 47 and 47' thereby maintaining the ambient uncontaminated by the lubricant. The lubricant 43 in the reservoirs 47 and 47' is passed through the return ports 46 and 46' into the reservoirs 45 and 45' in the sleeves 37 and 37'. The labyrinth step seals 50 provide further means for preventing the lubricant 43 from escaping to the surrounding environment. In one configuration the clearance and corners were designed so that in a 1g loading condition only a single drop formed over a 24 hour period of standing. This single drop remained stable until a new acceleration or rotation condition sheared it off. Since there is no 1g loading in a space environment the escape rate of the lubricant 43 from the spaces 44 will be smaller.

As opposed to ball bearings which are limited in the amount of lubricant they may contain due to resultant operating instabilities and power changes, the disclosed hydrodynamic bearings 31 and 32 can theoretically contain an order of magnitude more lubricant than they require without affecting their performance. For example, if a test is run which demonstrates 100 mg of lubricant is required for 6 month's of operation and the bearing is to operate for 3 years, then it will require 600 mg of lubricant to satisfy this requirement. 6,000 mg of the lubricant can be initially put in the reservoirs to insure meeting this requirement without drastically changing the design of the bearings.

For applications requiring extremely long life hydrodynamic bearings the closed loop lubrication system shown in FIG. 3 is preferred. In this system the wick 60 is fastened in a bearing end plate and rotates with a tight clearance hole 61 in the internal cavity of the journal trunnion 14. There is rubbing contact between the surface of the wick 60 and the internal diameter of the hole 61; rather the lubricant forms a film in the clearance hole around the wick 60 which is drawn off by a cone-shaped member 62 and centrifuged back into the reservoir cavity within the journal end 14. The pump formed by the action of the reservoir element 52 and the wick 60 inserted in the clearance hole has been demonstrated to pump 500 mg of lubricant (oil) in approximately 6 hours up through a gravity head of 3 inches.

The reservoir 42 and the return elements 45', 47', 52 and the wick 60 may be formed from any suitable absorbent porous material. In addition to functioning as reservoirs this material also provides a filtering action for the lubricant in the system. A suitable material for this application is a sintered nylon which is manufactured by taking very small particles of nylon and sintering them together with heat pressure to form a material having up to 50 percent microscopic voids by volume. Of course, other materials may be used such as sintered brass and the like.

In practice, all of these elements are fully impregnated with the lubricant prior to assembly. Therefore, in operation, centrifugal force on the rotating reservoir 42' reduces the fluid pressure therewithin. Thus, if the wheel is stopped, any excess of fluid within the trunnion chamber or within the bearing itself will be drawn back into the reservoir 42' in sponge-like fashion. Any excess lubricant which enters stationary elements 45', 47', 52 and wick 60 increases the fluid pressure in these elements and the fluid therefor tends to flow away from seal 50' and toward wick 60 to be redistributed within the trunnion chamber by the action of the rotating inclined wall of member 62.

In both embodiments of the present invention, it will be noted that in accordance with the teachings of the present invention, the fluid film from the bearing is replenished upon demand from a reservoir within the rotating journal, and close to its axis of rotation, through ports in the journal which open into the bearing clearance at points of low fluid pressure. This low pressure area is produced by the pumping action of the herringbone configurations and they are designed such that the low pressure area is substantially the same as the pressure at the feed pore orifice produced by centrifugal force at the reservoir. Thus, fluid from the reservoir will only be required to replenish any fluid which may escape from the bearing. This could occur for example when the journal is at rest and fluid is squeezed out due to vibrations and the like, or perhaps under high acceleration loads when the journal is rotating. In any event, the loss would amount to but a drop or two.

The relationship between load and deflection in a simple journal bearing is given by the equation:

$$W = \pi \mu d^3 N l / 4 C^2 \; \epsilon/(1-\epsilon^2)^2 \; [\pi^2(1-\epsilon^2) + 16\epsilon^2]^{1/2} \tag{1}$$

where
  $W$ = applied load
  $\mu$ = fluid viscosity
  $d$ = shaft diameter
  $N$ = rotor speed l = journal length
C = radial clearance
ε = eccentricity ratio (ratio of deflection to radial clearance),
ε = e/c If load capacity is defined as the load necessary to cause a deflection equal to 80 percent of the gap, the total load capacity is:

$$W = 5.6\pi \, \mu d N l^3 / C^2 \qquad (2)$$

Bearing torque is given by the relationship:

$$M = 2\pi \, \mu R^3 N l / C \, 2\pi / (1-\epsilon^2)^{1/2} \qquad (3)$$

If the bearing is lightly loaded the torque is:

$$M = 4\pi^2 \, \mu R N l / C \qquad (4)$$

where: M = bearing torque
R = journal radius

The fluid equations for the bearing reveal that the radial load capacity and the dynamic torque are essentially equally dependent upon all of the primary design parameters except the bearing clearance. In fact, the ratio of operating torque to radial load capacity for the journal bearing is essentially dependent upon radial clearance for a system which operates at low eccentricity ratios. A minimum torque system is designed for a given radial load requirement by providing a journal clearance which is as small as practical. This characteristic also provides for optimum lift-off and operating stability of the bearing. The minimum practical bearing clearance is primarily dictated by the shaft and housing compliance. Once the clearance has been established the other design parameters of the bearing, which have equal influences on torque and load capacity, are selected to meet a given environmental design objective. This procedure establishes a rotor support system by which a given design objective is accomplished at a minimum power penalty. The material for the bearing surfaces are selected to minimize galling, reduce starting friction and provide dimensional stability. These properties are obtained from materials that possess a high elastic modulus, low density, small grain size, low porosity, high bond strength and lack of mutual solubility with mating materials.

Undesirable changes of bearing performance parameters occur over the operating temperature range because of variations in the kinematic viscosity of the lubricant 43. The disclosed bearing configuration uses a passive compensation system that adjusts the operating clearances in the bearing as a function of temperature. The compensation which is a change in gap varies linearly with temperature and results in a square law variation in stiffness as shown by the load Equation (1). The change in viscosity is logarithmic with temperature and causes a direct variation in bearing stiffness. With proper selection of the temperature at which the bearing parameters are optimized, temperature changes over the operating temperature range cause a maximum of ± 10 percent variation in bearing stiffness due to the offsetting effects of the viscosity change and gap change, i.e., since the load $$W = f \, \mu / C^2 \text{ and } \mu = f(\log T)$$

and $$C = f(T) \text{ or } C^2 = g(T)^2$$

then W≈constant with temperature (over the operating range).

The procedure for obtaining the lubricant and materials in the journal to compensate for changes due to temperature in the radial direction includes choosing a lubricant having a specific viscosity characteristic. The viscosity characteristic is incorporated in a computer program along with the load equation, the subcomponent effective lengths and the temperature coefficient of the plurality of materials which are the best possible candidates for use in the journal bearing. The computer provides output information indicative of the triad of materials having coefficients of thermal expansion which will provide the most linear performance for the lubricant being used and the specific load equation to be satisfied. One combination of materials used in a journal bearing for a control moment gyroscope utilized AISI 52–100 for the outer sleeve material 41, brass for the inner sleeve 40, 303 stainless steel for the journal ends 14 and Plexol 262, a synthetic lubricant manufactured by Rohm and Haas, Philadelphia, Pa.

In operation, as the temperature of the lubricant 43 increases, its viscosity decreases and the physical dimensions of the combination of materials also vary with temperature so that the clearance in the bearings 31 and 32 is reduced by a prescribed amount with the increase in the temperature. Matching the journal materials, the lubricant and the load equation allow specific hydrodynamic fluid-film bearings to be designed to meet particular operating requirements over a relatively wide range of temperature whereas in prior art hydrodynamic fluid-film bearings, the design was limited to operation within narrow temperature limits. This was compensated for by the addition of temperature control devices which were usually unreliable, costly and complex.

In the radial direction of the bearings 31 and 32 primary interest is directed to the change in thickness with temperature of the journal ends 14 and the materials 40, 40' and 41, 41' in the sleeves 37, 37'. Since the diameter to length ratio is not 1, different materials must be used to provide the required compensation. If the ratio were 1, the same materials could be used to provide both radial and axial compensation. This ratio will be less than 1 in most gyroscope applications since the length of the journal ends 14 will usually be greater than their diameters. The lubricant chosen for a particular application will have a certain viscosity versus temperature characteristic over a specific range of temperatures. Each material has a particular coefficient of thermal expansion (expansion versus temperature characteristic) which, taken together with the lubricant's viscosity, will determine the performance of the bearings over a range of temperatures or a specified load. Choosing the materials which will provide the established clearance between the journal end 14 and sleeve 37 with the chosen lubricant 43 over the range of temperatures and the specified load requires matching the coefficient of thermal expansion of a plurality of materials with the viscosity characteristic of the chosen lubricant 43 over the range of temperatures for the specified load. Because of the repetitive nature of this procedure all the data may be incorporated in a computer program which will perform the matching process and provide output information indicative of the materials to be used in the journal end 14 and sleeve 37 that will provide the best match for a given set of operating conditions in the radial direction.

In practice two different materials are usually required in the sleeve 37, 37' to provide adequate compensation in the radial direction. However, it will be understood by those skilled in the art that in some applications only one material will suffice to provide the desired compensation, i.e., the element 41 of bearing 31 may be eliminated.

Once the materials required in the radial direction are known, the additional material needed in the thrust bearing sleeve 37' to provide passive compensation in the axial direction can be determined. In the axial direction the journal end 14 includes the material already specified by the computer as the best match for a given set of operating conditions in the radial direction. Therefore, the coefficient of thermal expansion of member 41 of this material is used as a known entity in determining the third material needed in the members 53 and 53' of the sleeve 37'. However, the parameter to be considered is different because in the radial direction interest was directed toward the thickness of the journal end 14 whereas in the axial direction interest is directed toward the length of the journal end 14. The same applies to the two known materials in the sleeve 37'. In the radial direction interest was directed toward their thickness while in the axial direction interest is directed towards the effect in the axial direction. Therefore different computer programs are required to determine the third material needed to provide the thermal compensation for the thrust bearing members 53, 53' in the axial direction. The same procedure is repeated until the third material is chosen which will provide the best match for the given set of operating conditions in the radial direction.

In a prior art control moment gyroscope 10, which employed spin type ball bearings, means had to be provided to compensate for the induced axial strains across the rotor produced by pressure and temperature gradients during operation of the device. This compensation is known in the art as pre-load bias and it serves to compensate for the changes in the strains in the axial direction produced by temperature and pressure gradients acting on the diaphragm shells 23, 24, 25, and 26 of the gyro 10. In the prior art device, the bearing pre-load was fixed by employing duplex bearings and thermal compensation was provided by allowing one set of preloaded duplex bearings to slide within its mount. This arrangement required extremely precise machining of large bores and even then run-outs could not be eliminated. Also, these bores were sometimes lined with silver, gold or other sacrificial coatings to enable the device to pass all the random vibration requirements without galling while still functioning as a freely sliding fit.

In the gyroscope 30, shown in FIG. 2, the floating journal 31 also functions as a translating journal. Thus sliding sleeves are eliminated because the journal end 14 in the bearing 31 may be designed with a ± 100 microinch clearance in the axial direction which will allow the floating bearing trunnion 14 to slide back and forth and yet tolerate all the random vibrations to which the gyroscope 30 may be subjected. Since the floating bearing 31 is designed primarily as a rotating bearing the translating feature of the bearing is an additional benefit obtained by merely designing into the bearing sufficient clearance in the axial direction.

While the invention has been described in its preferred embodiment, it is to be understood that the words which have been used are words of description rather than of limitation and that changes within the purview of the appended claims may be made without departing from the true scope and spirit of the invention in its broader aspects.

I claim:

1. A hydrodynamic journal bearing having a specified radial load capacity suitable for operation over a prescribed range of temperatures comprising
   journal means including a selected material having a first coefficient of thermal expansion and a specific radial dimension,
   sleeve means including at least two selected materials having second and third coefficients of thermal expansion, which are different from each other and each of which is different than the coefficient of thermal expansion of the journal means, and specific radial dimensions, said sleeve means being positioned relative to said journal means to provide a space therebetween, and
   fluid means filling said space between said journal means and said sleeve means having a coefficient of viscosity which varies logarithmically with temperature and coacts with said selected materials having respective coefficients of thermal expansion whereby said space between said journal and said sleeve means varies as a linear function of temperature thereby providing a hydrodynamic bearing having a radial load capacity which remains substantially constant over said prescribed range of temperatures.

2. A hydrodynamic bearing as recited in claim 1 in which said journal means and said sleeve means include selected materials having coefficients of thermal expansion such that said specific radial dimensions increase linearly with temperature and said fluid means includes a liquid having a coefficient of viscosity which decreases logarithmically with temperature whereby said space between said journal means and said sleeve means decreases linearly with temperature as said viscosity of said liquid decreases logarithmically with temperature.

3. A hydrodynamic bearing as recited in claim 2 in which said selected material in said journal means includes 303 stainless steel, said sleeve means includes a first material of AISI 52–100 and a second material of brass and said fluid means includes a quantity of lubricant-Plexol 262.

4. A hydrodynamic bearing as described in claim 1 in which said journal means includes a rotating reservoir containing a quantity of fluid means and a plurality of ports located at the ends of said journal means for creating a high pressure area midway between said ends of said journal means, said ports allowing said fluid means in said reservoir to automatically replenish any depletion of said fluid means in said space between said journal means and said sleeve means from said reservoir means.

5. A hydrodynamic bearing as described in claim 4 in which said ports are located midway between said ends of said journal member and high pressure areas are created at the ends of said journal member.

6. A pair of spaced hydrodynamic bearings for supporting a rotatable device subject to axial displacement under variable operating temperatures comprising
first bearing means including a first journal member and a first sleeve member in which said first journal member includes surface configurations for producing areas of low pressure at the ends of said first journal member and areas of high pressure at the center of said first journal member thereby providing radial support only to said rotatable device, and second bearing means including a second journal member and a second sleeve member in which said second journal member includes surface configurations for producing areas of high pressure at the ends of said second journal member and areas of low pressure at the center of said second journal which provides radial support to said rotatable device and axial support surfaces coupled to said second journal member and said second sleeve member having surface configurations for producing areas of high pressure proximate said second journal member and areas of low pressure at the periphery of said axial support surfaces thereby providing axial support to said rotatable device.

7. A pair of spaced hydrodynamic bearings as described in claim 6 in which said journal means includes rotating reservoir means disposed within said journal means and ports in the surface of said journal means for connecting said reservoir means with said areas of low pressure between said journal means and said sleeve means.

8. A closed loop fluid system for hydrodynamic bearings which include a rotating member and a stationary member comprising
rotating reservoir means including sintered material disposed within said rotating member for storing a quantity of said fluid,
stationary reservoir means including sintered material disposed on the interior exposed surfaces of said stationary member for collecting a quantity of said fluid, and
pump means including a wick of sintered material connected to said stationary reservoir means and journalled within said rotating member for conducting said fluid from said stationary reservoir means to said rotating reservoir means thereby providing a closed loop circulating flow of fluid within said hydrodynamic bearing.

9. A combination journal and thrust hydrodynamic bearing having a specified radial load capacity and a specified axial load capacity for operation over a prescribed range of temperatures comprising
journal means having radial and axial surfaces including a material having a first coefficient of thermal expansion and specific radial and axial dimensions, sleeve means having radial and axial surfaces including at least three selected materials having second, third and fourth coefficients of thermal expansion which are different from each other and each of which is different from the coefficient of thermal expansion of the journal means, and specific radial and axial dimensions, said sleeve means being positioned relative to said journal means to provide radial and axial spaces therebetween, and
fluid means filling said spaces between said journal means and said sleeve means having a coefficient of viscosity which varies logarithmically with temperature and coacts with said selected materials having respective coefficients of thermal expansion whereby said spaces between said journal and said sleeve means vary as a linear function of temperature thereby providing a combination hydrodynamic bearing having respective radial and axial load capacities which remain substantially constant over said prescribed range of temperatures.

10. A hydrodynamic bearing as recited in claim 9 in which said journal means and said sleeve means include selected materials having coefficients of thermal expansion such that said specific radial and axial dimensions increase linearly with temperature and said fluid means includes a liquid having a coefficient of viscosity which decreases logarithmically with temperature whereby said spaces between said journal means and said sleeve means decrease linearly with temperature as said viscosity of said liquid decreases logarithmically with temperature.

* * * * *